Nov. 25, 1969   H. P. HENDERSON   3,480,299
PIPE NIPPLE
Filed Sept. 11, 1968
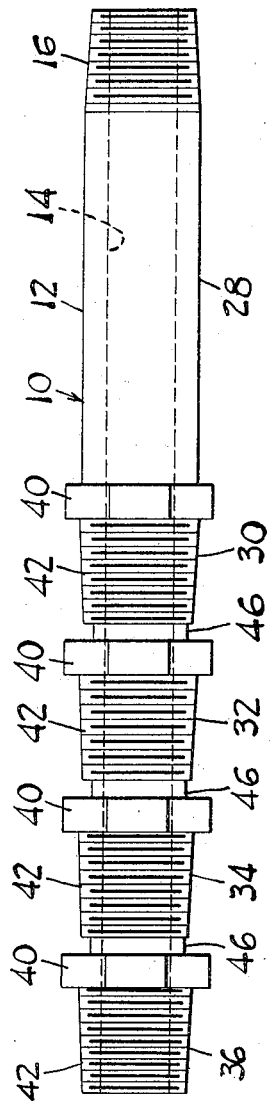
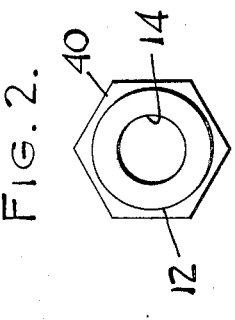
INVENTOR.
HAROLD P. HENDERSON
BY
Christel & Bean
ATTORNEYS

United States Patent Office 3,480,299
Patented Nov. 25, 1969

3,480,299
PIPE NIPPLE
Harold P. Henderson, 271 Northwood Drive,
Kenmore, N.Y. 14223
Filed Sept. 11, 1968, Ser. No. 758,962
Int. Cl. F16l 9/22
U.S. Cl. 285—4         4 Claims

ABSTRACT OF THE DISCLOSURE

A pipe nipple having a tubular body composed of a plastic material and having a bore longitudinally therethrough. A plurality of integral separable sections form the composite nipple whereby one or more sections may be severed to provide nipples of selective lengths. Each section has a hex formation at one end and an externally threaded portion at the other end.

Background of the invention

This invention relates to pipe couplings, and more particularly, to a new and improved pipe nipple severable to provide nipples of selective lengths.

In piping systems and plumbing installations, various types of pipe couplings having different dimensions are employed to join conduits together and attach various fluid control devices thereto. Generally, the couplings and fittings are composed of metal of predetermined lengths and configurations. If, for example, two internally threaded conduits are to be connected together, a pipe nipple of a certain length is required. Thus, an installer or repairman must carry a sufficient number of different length nipples to accommodate varying lengths of couplings although the thread size and diameter may be the same. It is also frequently necessary to cut and thread a length of pipe on the job to provide a nipple of required length. Often, two nipples are joined by a union member to provide the necessary length of coupling desired, resulting in excessive costs and extra inventory.

Summary of the invention

The nipple of the present invention, as hereinafter described, provides a solution to the above problem by providing a new and improved nipple formed of a plastic material which is simple and rugged in construction, low in cost, durable in use, and severable to provide nipples of various selective lengths.

Generally speaking, the nipple of the present invention comprises an elongated, tubular body composed of a plastic material and having a bore longitudinally therethrough. The nipple is formed of a plurality of separable sections integrally connected at their ends, each having a threaded portion at one end and a hex formation providing wrench engaging surfaces at the other end thereof. Thus, the nipple may be severed easily to provide nipples of required lengths.

Brief description of the drawing

FIG. 1 is an elevational view of one form of a nipple constructed in accordance with the principles of this invention; and FIG. 2 is an end view of the nipple of FIG. 1.

Description of the preferred embodiment

Referring to FIG. 1 of the drawings, a preferred embodiment of a pipe nipple, generally designated 10, constructed in accordance with the principles of this invention comprises an elongated, tubular body 12 having a smooth inner bore 14 extending longitudinally therethrough. Body 12 is formed of a suitable lightweight relatively rigid plastic material, such as polypropylene, by conventional injection molding or in any other desired manner. Although body 12 is preferably formed of polypropylene which is heat resistant at elevated temperatures above the boiling point of water, the principles of this invention envisage the use of other plastic materials having desired thermal characteristics.

Tubular body 12 has conventional pipe threads 16 at one end thereof for engagement with an internally threaded coupling means of a piping system. It should be understood that other coupling means may be provided on the end of body 12 in lieu of external threads 16, if desired.

Tubular body 12 comprises an elongated cylindrical section 28 and a series of separable sections 30, 32, 34 and 36, each separable section having a hex formation 40 and a threaded portion 42 consisting of conventional pipe threads. The threaded portion 42 of each section is integrally connected to the hex formation of the adjacent separable section by a cylindrical necked portion 46, which has a generally thinner wall thickness than body 12. The necked portion 46 may comprise V-formations to facilitate cutting or sawing. Hex formations 40 extend radially outwardly beyond body 12 to provide flat surfaces for receiving a wrench or similar tool.

A significant feature of the present invention is that nipple 10 may be severed at any one of the necked portions 46 to provide selective overall lengths for the nipple, as desired. FIG. 1 illustrates a nipple having a length including sections 28, 30, 32, 34 and 36. By severing body 12 at necked portion 46 between sections 34 and 36, for example, a nipple of the combined lengths of sections 28, 30, 32 and 34 is provided. Because the material of nipple 10 is formed of polypropylene, it can be readily severed at the necked portions 46 without leaving any exposed jagged edges. It should be understood that any necessary or desired number of these separable sections may be employed and their respective lengths may vary, as desired.

The present invention thus provides a simple and novel nipple formed of a lightweight plastic material having a plurality of separable sections integrally connected to form a unitary composite nipple whereby one or more sections may be severed to provide a nipple of a selected length.

A preferred embodiment of this invention having been hereinabove described and illustrated in the drawing, by way of example, it is to be understood that numerous modifications thereof can be made without departing from the broad spirit and scope of this invention.

I claim:
1. A pipe nipple comprising an elongated tubular body formed of a plastic material and having a bore of substantially constant diameter extending longitudinally therethrough, said body comprising a plurality of integrally connected sections; one of said sections having pipe threads at its opposite ends and a flatted wrench formation, the remaining sections each having a flatted wrench formation at the end toward said one section and an externally pipe threaded portion at its other end; and necked portions disposed about the periphery of said body between said sections for facilitating the severance of said sections.

2. A nipple according to claim 1 wherein each flatted wrench formation is disposed radially outwardly from the tubular body.

3. A nipple according to claim 1 wherein said plastic material is polypropylene.

4. A nipple according to claim 1 wherein the material is a high-temperature thermoplastic material having a softening temperature above 220° F.

References Cited

UNITED STATES PATENTS

| | | | |
|---|---|---|---|
| 1,185,846 | 6/1916 | Simpson | 285—4 X |
| 1,904,675 | 4/1933 | Boyer | 285—390 |
| 2,419,453 | 4/1947 | Kolevar | 285—39 X |
| 2,449,754 | 9/1948 | Seitz | 285—4 |

REINALDO P. MACHADO, Primary Examiner

D. W. AROLA, Assistant Examiner

U.S. Cl. X.R.

85—1; 285—423